(12) United States Patent
Roth

(10) Patent No.: US 6,402,269 B1
(45) Date of Patent: Jun. 11, 2002

(54) DECORATIVE COMPUTER MONITOR COVER

(76) Inventor: Ellen Roth, 47 E. 88th St., New York City, NY (US) 10128-1152

(\*) Notice: Subject to any disclaimer, the term of this patent is extended or adjusted under 35 U.S.C. 154(b) by 0 days.

(21) Appl. No.: 09/569,580

(22) Filed: May 9, 2000

Related U.S. Application Data

(63) Continuation-in-part of application No. 29/109,428, filed on Aug. 13, 1999, now Pat. No. Des. 424,540.

(51) Int. Cl.⁷ .............................................. A47B 81/06
(52) U.S. Cl. ..................................... 312/7.2; 312/208.3
(58) Field of Search ............................ 312/7.2, 208.3, 312/223.2; 348/842, 834; 248/918; 359/601

(56) References Cited

U.S. PATENT DOCUMENTS

| | | | | |
|---|---|---|---|---|
| 1,315,794 A | \* | 9/1919 | Richards | 312/208.3 |
| 4,809,126 A | | 2/1989 | Burkman et al. | 361/212 |
| 5,115,345 A | | 5/1992 | Hobson et al. | 359/601 |
| 5,163,870 A | | 11/1992 | Cooper | 454/184 |
| 5,464,214 A | | 11/1995 | Griffin | 312/7.2 X |
| 5,564,209 A | \* | 10/1996 | Zagnoli | 312/7.2 X |
| D382,260 S | \* | 8/1997 | Smith | D14/114 |
| 5,759,644 A | | 6/1998 | Stanley | 428/14 |
| 5,761,022 A | | 6/1998 | Rankilor | 361/214 |
| 5,772,293 A | \* | 6/1998 | Hughes | 312/7.2 X |
| 5,894,878 A | | 4/1999 | Morgan et al. | 312/7.2 X |
| 5,988,823 A | \* | 11/1999 | Wong | 348/842 X |
| 6,209,973 B1 | \* | 4/2001 | Steinberg | 312/7.2 |

OTHER PUBLICATIONS

Time Magazine, (Advertisement), "Monimals USA", p. 95, Jul. 1998.

\* cited by examiner

*Primary Examiner*—James O. Hansen
(74) *Attorney, Agent, or Firm*—Schulte Roth & Zabel LLP; Joel Lutzker; Donna Angotti

(57) ABSTRACT

A decorative cover for a computer monitor made of a pliable material that enables it to be placed over a computer monitor to protect it from hazardous elements. The decorative cover is also in the form of an animal that will enhance the appeal of the computer to a given group of computer users. There is also a conductive material disposed inside of the decorative cover that helps discharge electrostatic charges from the computer monitor when the cover is placed over the monitor and in contact with a ground.

17 Claims, 3 Drawing Sheets

DECORATIVE COMPUTER MONITOR COVER

This is a continuation-in-part of Design Application No. 29/109,428, filed on Aug. 13, 1999 now U.S. Des. 424,540.

BACKGROUND OF THE INVENTION

1. Field of the Invention

This invention relates generally to a cover for computer equipment which enhances the appeal of the computer, and more specifically to a decorative computer monitor cover resembling an animal that will keep the monitor clean and also help reduce the electrostatic charge on the monitor.

2. Discussion of the Background Art

Computers have become prevalent at home and in the office. This prevalence of computers and their importance in our lives has led to a need to protect them from dust, static and other elements. Computers are often subject to dust-laden environments, static discharge and even beverage spills. In addition to protecting computers, it is also necessary to make them less intimidating and more appealing to people, so that they will be utilized more often.

Surprisingly, many adults and children still perceive computers as complex and intimidating machines. Thus, making computers less intimidating to potential users would remove the anxiety people have toward them. Additionally, children have another shortcoming when it comes to computers. Generally children have short attention spans and don't become motivated to do anything unless it is exciting, stimulating or interesting. Consequently, a decorative monitor cover would make the computer more appealing to children as well as adults.

Exposure to various environments and elements has led to various ways and methods to protect a computer. One way to protect a computer is with a cover. Traditionally, computer covers, specifically those that cover a computer monitor, are primarily either a decorative ornament or a protective shield. An example of a decorative ornament for a computer is U.S. Pat. No. 5,072,998 issued to Bobby Y. Oh. The Oh patent uses plush stuffed anatomical members mounted on the computer monitor for decoration to try to make the computer appear less intimidating to children and encourage its use by them. This invention has anatomical members comprising a head; arms or feet, detachably secured to the monitor using hook and loop fasteners. Consequently, it does not completely cover the monitor and protect it. Another deficiency of the Oh patent is that it requires a plurality of hook and loop fasteners to be permanently attached to the surface of the monitor. Since these fasteners must be permanently attached to the surface of the monitor, the removal of the fasteners will cause some damage to—the monitor and usually leaves one with an unpleasant looking monitor. Also, some computer monitor covers of the prior art are only made of colored fabrics or plastics. However, for a computer to be truly personalized, it needs a more decorative element, which adds to the computer's overall appearance. This decorative element will allow one to personalize his or her computer by expressing oneself such that his or her computer can be distinguished from another person's computer. A way to personalize a computer is with a decorative computer monitor cover.

It is well known that computer monitors rely on electrical stimulation to generate an image on its screen. Consequently, this electrical stimulation produces an electrostatic charge on the display surface of the monitor screen. This build up and discharge of electrostatic charges can damage the computer causing loss of memory stored therein or even complete failure of the computer and related equipment. Additionally, this electrostatic discharge ("ESD") creates an affinity for dust that can damage the computer. The damage caused to computers and related equipment by ESD has long been known. ESD affects and impairs all aspects of a computer and its components. It has been estimated that ESD-related damages to computer equipment are as high as $10 billion per year. Thus, various efforts have been made to control the amount of electrostatic discharge. These efforts have included a grounded conductive pad on the desk or a grounded conductive pad on the floor beneath the computer operator. Most of these approaches are inadequate because of their appearance and difficulty of use. The difficulty of use is that a deliberate effort must be made to touch the conductive pad before touching the computer equipment to induce a static discharge.

SUMMARY OF THE INVENTION

The present invention provides a computer cover designed to be decorative and appealing, while also protecting the computer monitor from dangerous elements and electrostatic charges.

Accordingly, several objects and advantages of the present invention are:

(a) to provide a decorative cover which allows a person to decorate and personalize his or her computer monitor;

(b) to provide a decorative cover which provides a degree of protection to the computer monitor from dust or other hazards;

(c) to help reduce the electrostatic charge on the computer monitor;

(d) to provide a decorative cover which may be made of various fabrics and other covering materials;

(e) to provide a decorative cover which may resemble various animals;

(f) to provide a decorative cover to which features such as a pocket may be attached or applied;

(g) to provide a decorative cover which conforms to the general size and shape of the computer monitor; and (h) to provide a decorative cover which is easily removable.

At present none of these covers have been specifically designed to be decorative, appealing to people and also able to discharge electrostatic charges. Still further objects and advantages of the present invention will become apparent to those skilled in the art from a consideration of the following description and drawings.

To attain the above, the present invention essentially comprises a computer monitor cover which is a generally rectangular covering member. The covering member is made from a pliable material such as cloth, wool or leather. However, it may also be made from plastic or vinyl. The covering member has a front face, top face, left face, right face, back face, bottom opening, and a hanging appendage. All of the faces and the bottom opening of the cover form a cavity that surrounds the computer monitor. The cavity contains conductive material such as aluminum, steel or copper mesh attached inside. The conductive material is also run through the hanging appendage that will rest upon the desk for grounding the electrostatic charge.

DESCRIPTION OF THE PREFERRED EMBODIMENT

As used herein, the singular forms "a," "an" and "the" include plural referents unless the context clearly dictates otherwise.

Figure 1:
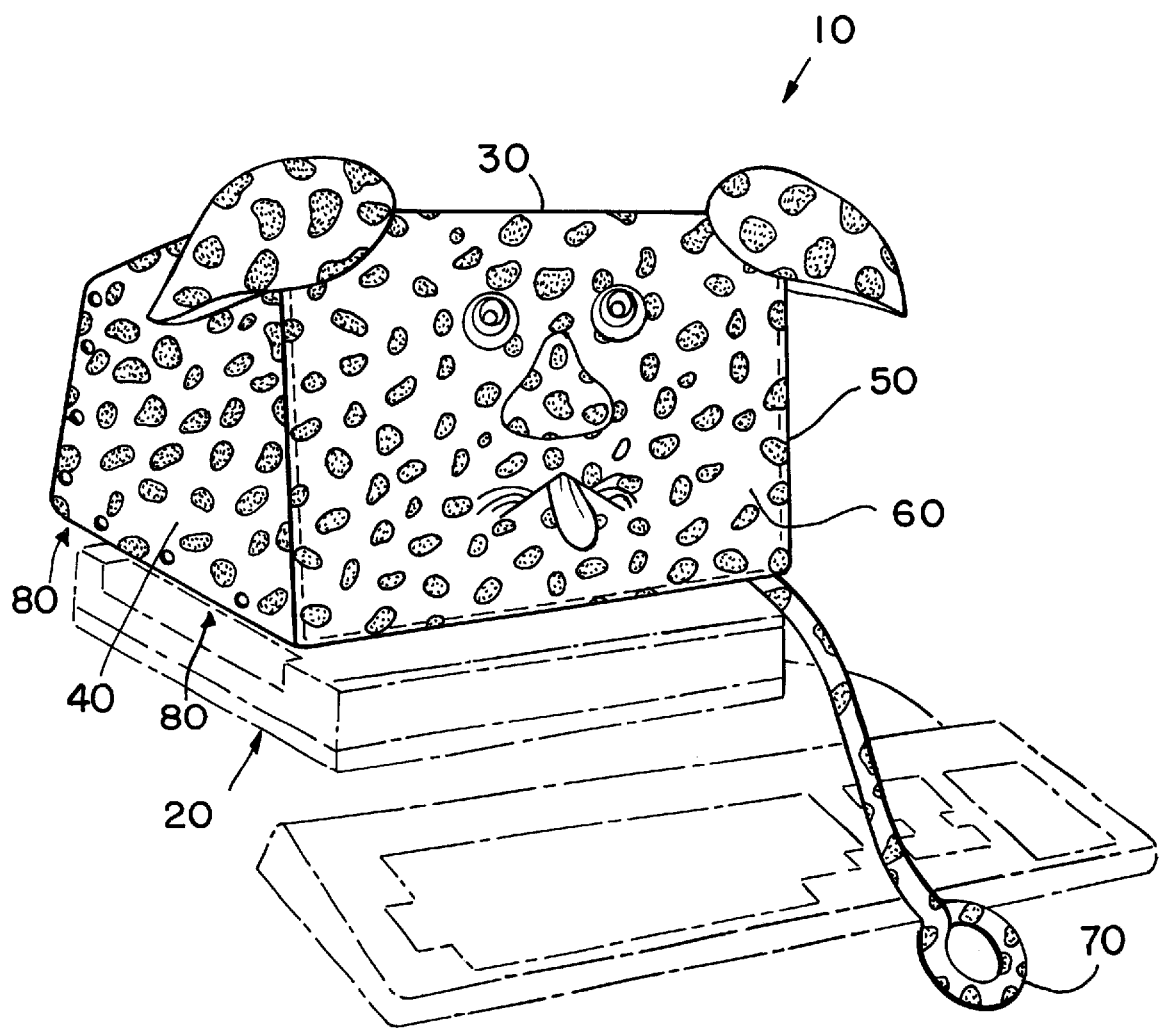
FIG. 1 shows a front perspective view of the present invention shown in place on a computer monitor.

Referring now to the drawings in general and in particular to FIG. 1 of the drawings there is shown a front perspective view of the present invention placed over a computer monitor.

The present invention is comprised of a plurality of components. Such components in their broadest sense include a decorative covering member 10, front face 60, right face 50, left face 40, top face 30, back face 55, bottom opening 80 with an inside cavity 85, and hanging appendage 70. Such components are individually configured and correlated with respect to each other so as to attain the desired objective.

Specifically, the present invention includes a generally decorative rectangular covering member 10. The decorative covering member is placed over a computer monitor 20, as shown in FIG. 1. The covering member is formed of cloth that covers at least four panels of the computer monitor. Preferably, the cloth is made of wool. The covering member, when covering the computer monitor, has a top face 30, left face 40, right face 50, back face 55, front face 60, and hanging appendage 70.

Figure 2:
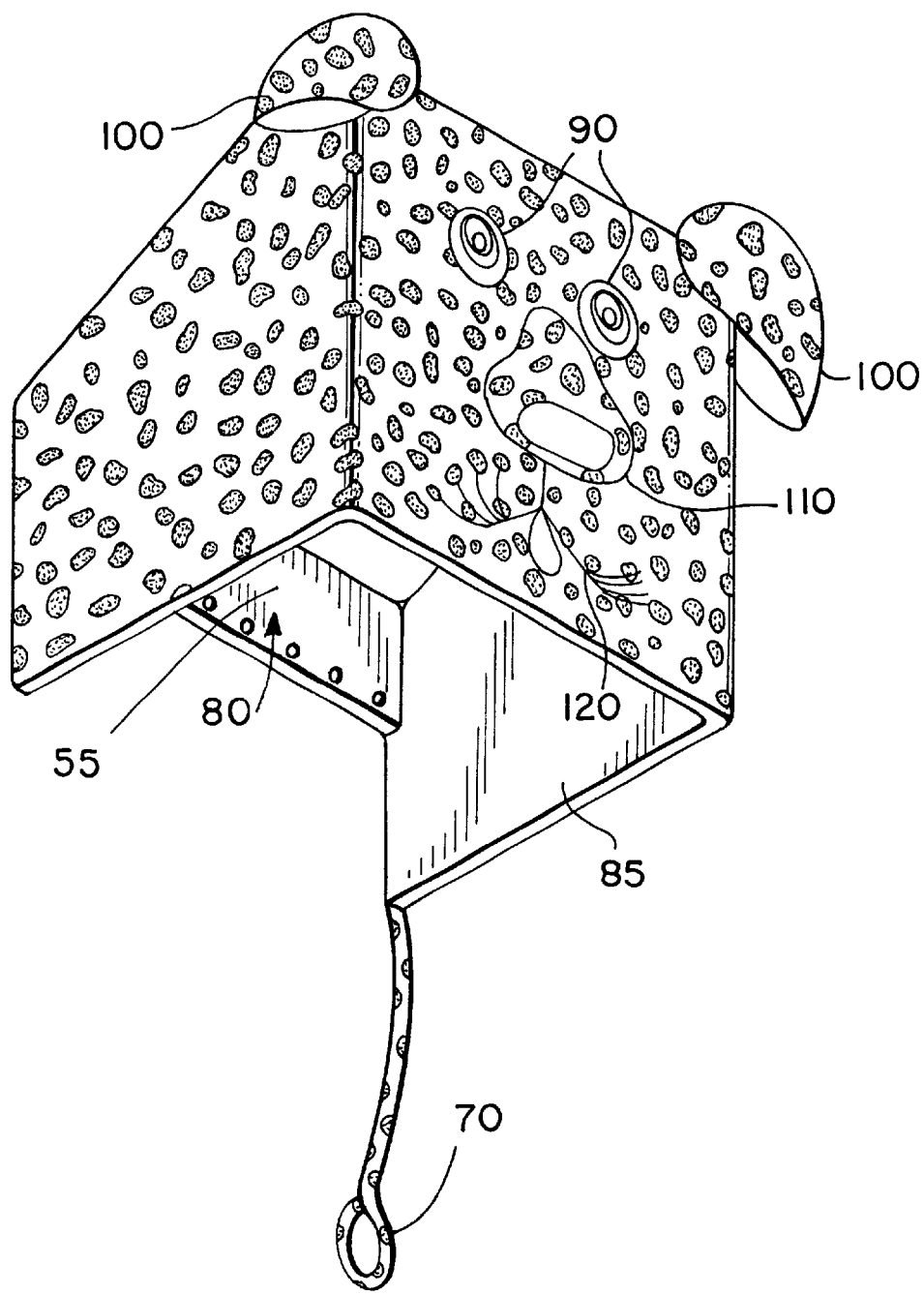
FIG. 2 shows a bottom perspective view of the present invention.

Referring now to FIG. 2 of the drawings, the decorative covering member 10 is shown free standing by itself. More specifically, the bottom opening 80 of the covering member can be seen with a cavity 85 inside of the bottom opening. Additionally, the covering member has eyes 90, ears 100, a nose 110, a mouth 120 and a hanging appendage 70.

Figure 3:
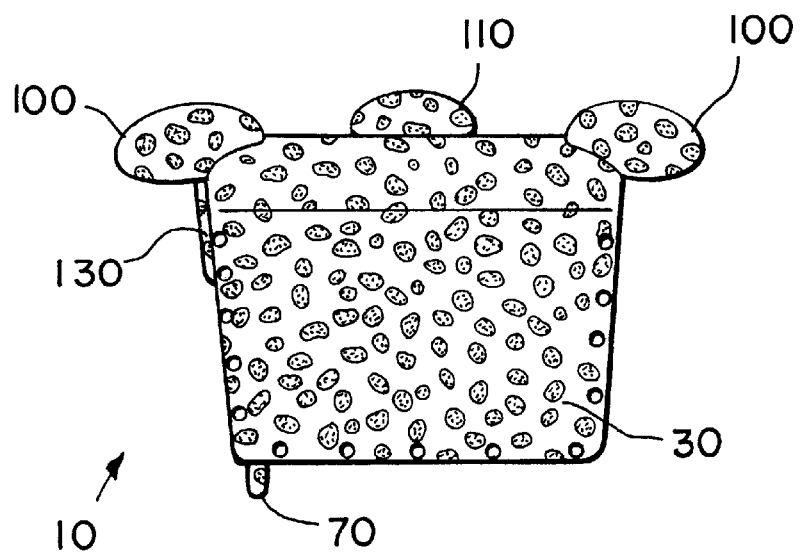
FIG. 3 shows a top perspective view of the present invention.

In FIG. 3 there is shown a top perspective view of the present invention. The decorative covering member 10 is shown with ears 100, a nose 110 and a hanging appendage 70. The top face 30 of the covering member can also be seen in this figure.

Figure 4:
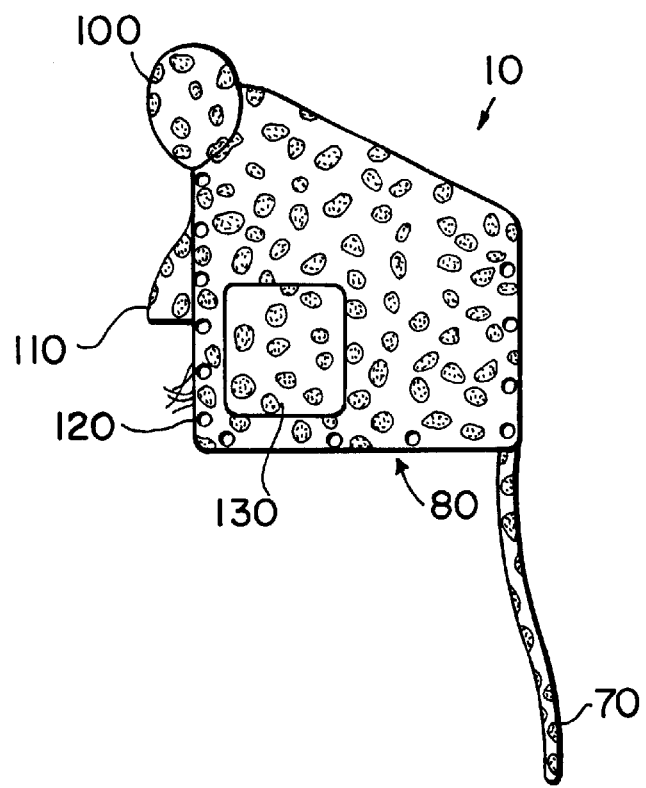
FIG. 4 shows a side prospective view of the present invention with a side pocket.

In FIG. 4, there is shown a side perspective view of the present invention. The covering member 10 is shown with a side pocket 130 attached to the side face of the covering member. The ear 90, nose 110 and hanging appendage 70 can also be seen in this figure.

The embodiments of the decorative monitor cover resemble animals such as cows, tigers or bears with the above features. The monitor animal cover can be made of any material such as plastic, wool, cloth, or leather. The material may also be elastic in nature. The elasticity of the cover will allow the annular body of the decorative covering member 10 to be stretchable over the display screen of the computer monitor. The covering member 10 also has a plurality of holes on its back 55, top 30, left 40 or right 50 face for ventilation. The front face 60 of the computer animal cover may also be a movable flap that will allow the cover to remain on the computer monitor during the use of the computer. There can be a Velcro means consisting of Velcro or any other sticky material on the covering member to allow the attachment of things to the outside of the cover. Also, the covering member may have at least one pocket 120 attached to it by Velcro, glue or stitching.

The manner of using the present invention is as described in the following:

The decorative cover is placed on a computer monitor 20 by first fitting the covering member 10, having the front face 60 facing the computer user and all other faces snugly fitted over the computer monitor 20. The next step is to insure that the conductive material that is attached inside of the cavity 85 of the decorative cover is in contact with the screen of the computer monitor 20. The conductive material inside the cavity of the cover can be aluminum, steel or cooper. Lastly, the hanging appendage 70, which may be arms, legs or a tail, must be lying or touching a surface such as a desk, wall or ground where the electrostatic charge can be discharged.

A securing means such as an elastic banding, hook and loop fastening strips or a combination of both of these means may be used for holding the cover in place and over all portions of the computer monitor 20. Also, a fastening means of an elastic band may be used for keeping the cover on the computer monitor 20.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claims is reserved.

What is claimed is:

1. In combination, a computer monitor and a decorative cover, said computer monitor comprising a viewing screen; and said decorative cover comprising:

a covering having a plurality of panels forming a hollow cavity and a hanging appendage extending from one of said panels; and a conductive material disposed along at least a portion of said hollow cavity in contact with said viewing screen, wherein said conductive material extends into said hanging appendage, and wherein said covering and said hanging appendage are configured to remove and ground electrostatic charges accumulating on said viewing screen.

2. The combination according to claim 1, wherein said decorative cover further comprises a plurality of decorative elements.

3. The combination according to claim 2, wherein said decorative elements and said hanging appendage cooperate to create an image.

4. The combination according to claim 1, wherein said decorative cover further comprises outer indicia for aligning said conductive material with said viewing screen of said computer monitor.

5. The combination according to claim 4, wherein said indicia include facial features including eyes.

6. The combination, according to claim 4, wherein said indicia include facial features including a mouth.

7. In combination, a computer monitor and a decorative cover, said computer monitor comprising:

a side surface;

a top surface; and a viewing screen; and said decorative cover comprising:

a covering having a pliable material adapted to cover said side surface and said top surface of said computer monitor;

an electrically conductive layer contacting said viewing screen of said computer monitor; and an electrically grounded hanging appendage connected to said electrically conductive layer.

wherein said decorative cover comprises an image of an animal, and wherein said electrically conductive layer and said electrically grounded hanging appendage are configured to remove and ground electrostatic charges accumulating on said viewing screen.

8. The combination according to claim 7, wherein said decorative cover further comprises outer indicia for aligning said conductive material with said viewing screen of said monitor.

9. The combination according to claim 8, wherein said indicia include facial features including eyes.

10. The combination according to claim 8, wherein said indicia include facial features including a mouth.

11. The combination according to claim 7, wherein said pliable material comprises plastic.

12. The combination according to claim 7, wherein said pliable material comprises leather.

13. The combination according to claim 7, wherein said pliable material comprises cloth.

14. A decorative cover for covering a computer monitor, comprising:

a covering having a plurality of panels forming a hollow cavity and a hanging appendage extending from one of said panels, each of said panels having an inside surface and an outside surface; and a conductive material covering said inside surface of at least one of said panels, said conductive material being exposed to the inside of said hollow cavity, wherein said decorative cover comprises an image of an animal, wherein said conductive material extends into said hanging appendage, and wherein said covering and said hanging appendage are configured to remove and ground electrostatic charges from the inside of said hollow cavity.

15. The decorative cover according to claim 14, wherein said decorative cover further comprises outer aligning indicia.

16. The decorative cover according to claim 15, wherein said indicia include facial features including eyes.

17. The decorative cover according to claim 15, wherein said indicia include facial features including a mouth.

* * * * *